June 2, 1936. H. E. N. PRUVOT 2,042,681
LUBRICATING DEVICE
Filed July 14, 1933

Inventor
H.E.N.Pruvot,
By
Glascock Downing Jubell
Attys.

Patented June 2, 1936

2,042,681

UNITED STATES PATENT OFFICE 2,042,681

LUBRICATING DEVICE

Henri-Éloi-Norbert Pruvot, Sotteville les Rouen, France, assignor to C. C. Wakefield & Company Limited, London, England Application July 14, 1933, Serial No. 680,482
In France July 18, 1932

2 Claims. (Cl. 184—6)

This invention relates to the supply, at a chosen point of the connecting rod to be lubricated, of oil or fluid grease delivered under pressure by an adjustable mechanical lubricator which is fixed relatively to the frame of the machine (steam engine of the stationary or marine type, portable steam engine, locomotive, pump, compressor of the piston type, or any other type of machines having connecting rods or similar parts).

The members to be lubricated can present, according to the manner in which they are assembled on the machine, the following particularities:

The bearing to be lubricated is completely enclosed, and is not mechanically accessible at either of its ends, which is the case of a connecting rod mounted on a crank shaft having one or more cranks;

Apparatus used in case the bearing to be lubricated is not mechanically accessible at either end. Example chosen: big end of a connecting rod for a locomotive, fitted on a bent axle.

The oil must therefore be led to the surface to be lubricated by a channel provided in the bearing of the big end of the conneecting rod. This is obtained by means of a toggle joint device constituted, on the one hand, by two rigid bars acting as a piping, or serving as support for a piping, and, on the other hand, by three special joints connecting:

(a) One end of the device to a fixed point of the frame of the machine;

(b) Both bars together;

(c) The other end of the device to the connecting rod, at a point adjacent to that which must be reached by the oil (big end of the connecting rod in the example chosen).

Moreover, these joints ensure the passage of the oil under pressure from one part of the piping to the other.

The invention is clearly illustrated in the accompanying drawing, in which:—

Figure 1:
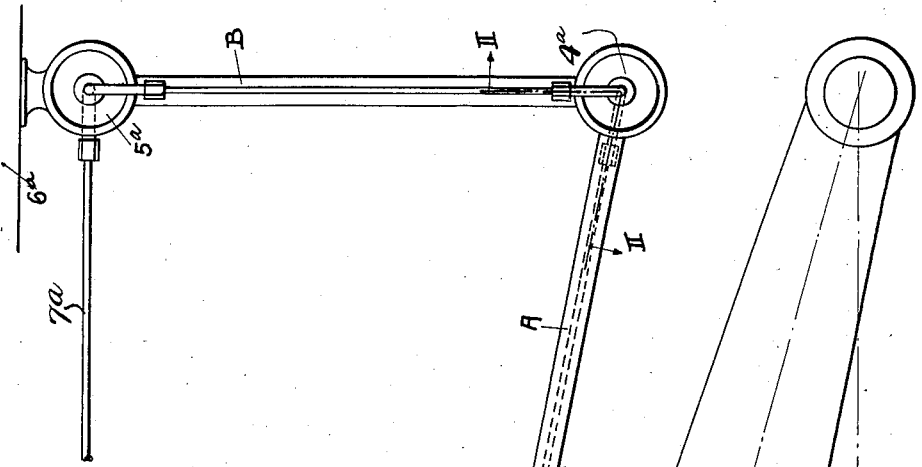
Fig. 1 is a diagrammatic view of the entire device.

Referring more particularly to the drawing,

A is one of the bars of the toggle joint device;
B the other bar of said device;
G the body of the driving connecting rod;
O the axis of rotation of the bent axle;
1a the crank pin to be lubricated;
2a the point where the oil must be led;
3a the joint connecting the bar A to the driving connecting rod;
4a the joint connecting the bars A and B;
5a the joint connecting the bar B to the fixed point 6a of the frame of the machine;
7a the pipe supplying oil under pressure to the joint 5a (this pipe is fixed relatively to the frame);
8a the pipe connecting the joint 3a to the point 2a to be lubricated. This latter pipe is fixed relatively to the connecting rod and terminates, immediately adjacent to the point to be lubricated, in a box containing a check ball 9a the function of which is to prevent emptying, by gravity, of all the pipings, when, the machine being at rest, the mechanical lubricator no longer supplies any oil.

The mechanical member which characterizes this toggle joint device is the toggle joint 3a, 4a, 5a (Fig. 1).

This toggle joint is constructed as follows, as shown in axial section in Fig. 2.

A fork 14 is arranged at the end of one of the bars of the toggle joint device. An eye 13 forms a part of the other bar. The tubular shaft 1 is hollow and is always rigid with 13. The fork 14 can therefore describe a certain angle about the axis of the eye 13.

A tube 5 supplies the oil under pressure. This tube which fits with slight friction in the tubular shaft 1, carries a cone which forms a joint with the ring 4 forcibly inserted in 1. This ring is made of a relatively plastic material (vulcanized fibre, Cellophane, etc.) unaffected by the action of the oil, or it is made of metal. In the latter case, the bearing portion is ground.

The tube 5 is pressed against the ring 4 by a spring 6 compressed by a nut 3 through the medium of a ball abutment 15 adapted to prevent direct friction of the spring on the nut. The nut 3 is locked on the tube 5 by a stud. An outlet tube 8, secured on the tubular shaft 1 through the medium of the plug nut 7, allows the passage of the oil having passed through the tubular shaft. A collar 23 prevents any displacement of the member 5 relatively to the member 14. Pipings, which are fixed relatively to 13 and 14, lead to the tubes 8 and 5, respectively.

The whole constitutes therefore a member having a double function: on the one hand, it joins the bars to each other, and, on the other hand, it constitutes a rotary joint for the passage of the fluid under pressure, both movements of rotation which moreover are synchronous movements, taking place about one and the same axis. The said two movements of rotation indicate on the one hand the articulation of the bars with each other and on the other hand the angular displacement of the bent piping on the tubular shaft 1.

Figure 2:
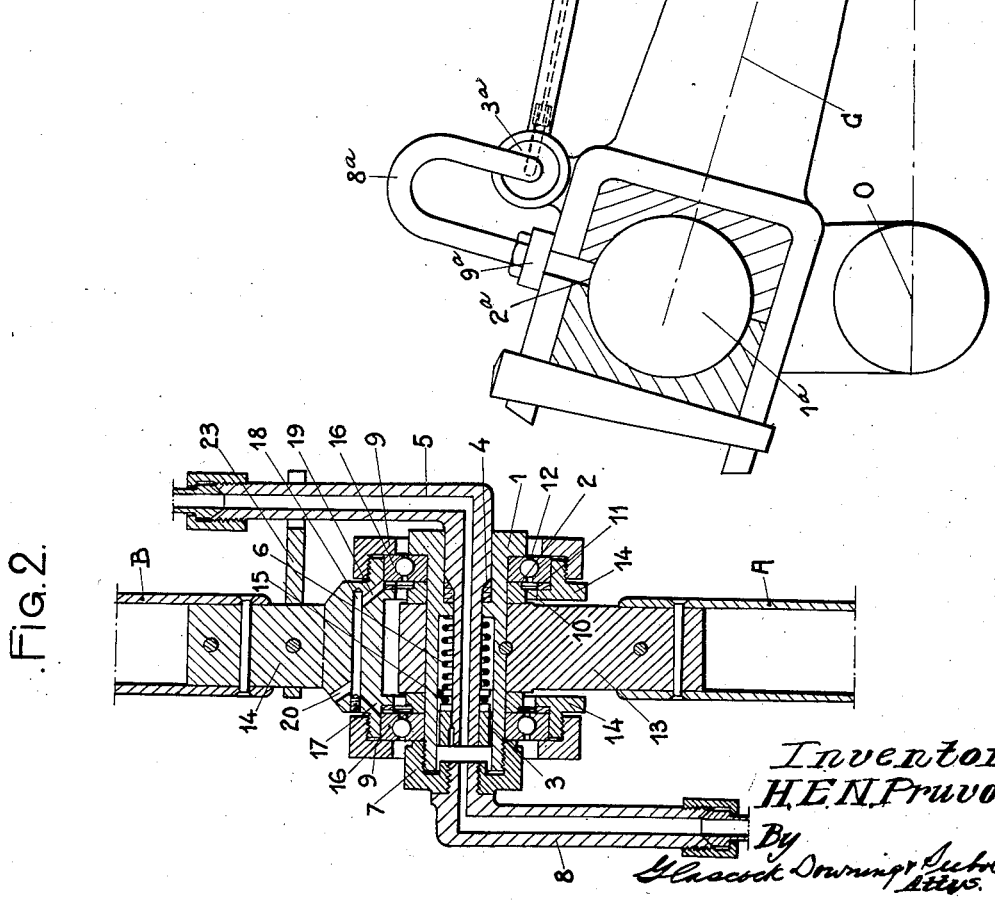
Fig. 2 is an enlarged vertical sectional view thereof on the line II—II of Fig. 1.

Fig. 2 shows all the details of construction for assembling the joint on ball bearings 16, clamped on 14' by nuts 9. Washers 10, 11 and 12 constitute, with the faces of the ball bearings and members 7 or 1, 2 and 14, fluid-tight chambers connected by channels 17, 18 and 19. The channel 20, in communication with 19, receives a nozzle allowing to inject under pressure grease for periodically lubricating the ball bearings.

If one of the joints 3ª or 5ª (Fig. 1) is considered, which joints are connected only to one of the bars of the toggle joint device, the other bar is replaced by a base member in alignment with 13 or 14, said member allowing the device to be secured either on the frame of the machine, or on the big end or the body of the connecting rod to be lubricated.

The joint which has just been described solves the problem wihch consists in ensuring the passage of the oil, from a fixed point to a movable piping (and reversely), or from a movable piping to another. The oil supplied by the fixed mechanical lubricator is therefore led to the point to be lubricated.

I claim:—

1. In a device for lubricating a member movable relatively to a fixed oil feeding source and which comprises two rigid bars pivoted together on a tubular shaft on the one hand and at their other ends on the other hand, one to the member to be lubricated and the other to the oil source, and pipes for the circulation of oil, the ends of the pipes to be put in communication engaging in the opposite ends of the corresponding tubular shaft which ensures this communication, in combination, a ring for fluid-tightness in the interior of the said tubular shaft and forming a bearing for a portion of one of the pipes which has a movement relative to this tubular shaft and a spring acting constantly for applying a certain pressure to the ring for fluid-tightness.

2. In a device for lubricating a member movable relatively to a fixed oil feeding source and which comprises two rigid bars pivoted together on a tubular shaft on the one hand and at their other ends on the other hand, one to the member to be lubricated and the other to the oil source and pipes for the circulation of oil put in communication at their corresponding ends through the tubular shaft, in combination, piping bent at a right angle, means for connecting one end of each piping to the corresponding end of the corresponding pipe, means for securing the other end of one of the bent pipes to the end of the corresponding tubular shaft, the free end of the other pipe engaging within the tubular shaft so as to be displaced in translation therein, the said tubular shaft having an inner flange, the end of the piping engaging in the said shaft having a part of smaller diameter for constituting opposite the said flange an inclined annular part, a tightening ring interposed between the said flange and the said inclined annular part, a nut screwed on to the end of the part of the piping engaging in the said tubular shaft and a spring interposed between the said nut and the said flange for urging the said piping axially against the tubular shaft in a direction for enabling the said inclined annular part to bear under pressure against the said ring and the latter against the corresponding flange.

HENRI-ELOI-NORBERT PRUVOT.